US012790978B2

(12) United States Patent
Surace

(10) Patent No.: US 12,790,978 B2
(45) Date of Patent: Nov. 10, 2026

(54) REPAIR OF CERAMIC MATRIX COMPOSITE GAS TURBINE ENGINE ARTICLE WITH MONOLITHIC CERAMIC REPAIR ELEMENT

(71) Applicant: RTX CORPORATION, Farmington, CT (US)

(72) Inventor: Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/037,990

(22) Filed: Jan. 27, 2025

(65) Prior Publication Data

US 2026/0218648 A1 Jul. 30, 2026

(51) Int. Cl.
*F02C 3/04* (2006.01)
*F01D 5/00* (2006.01)
*F01D 5/28* (2006.01)

(52) U.S. Cl.
CPC ................ *F02C 3/04* (2013.01); *F01D 5/005* (2013.01); *F01D 5/282* (2013.01); *F05D 2230/80* (2013.01); *F05D 2300/6033* (2013.01)

(58) Field of Classification Search
CPC .......... F01D 5/005; F01D 5/282; F01D 5/284; F23R 3/007; F02C 3/04; F05D 2230/80; F05D 2300/6033; F05D 2300/6034; B23P 6/00; B23P 6/04; B23P 6/005; B23P 6/045; Y10T 29/49732; Y10T 29/49734; Y10T 29/49735; Y10T 29/49737; Y10T 29/49739; Y10T 29/49318
See application file for complete search history.

(56) References Cited

U.S. PATENT DOCUMENTS 4,832,252 A * 5/1989 Fraser ..................... B23P 6/005 228/232
5,033,938 A * 7/1991 Fraser ..................... B23P 6/005 29/402.13
5,928,448 A * 7/1999 Daws ........................ B23P 6/00 156/92
6,200,092 B1 * 3/2001 Koschier ................. F01D 5/284 415/200
7,841,834 B1 * 11/2010 Ryznic .................. F04D 29/023 416/224

(Continued)

FOREIGN PATENT DOCUMENTS

FR 3164141 A1 * 1/2026 ........... C04B 37/001
WO WO-2017039607 A1 * 3/2017 ............ F01D 5/147

OTHER PUBLICATIONS

European Search Report for European Patent Application No. 26154522.2 mailed Jun. 17, 2026.

*Primary Examiner* — William H Rodriguez
(74) *Attorney, Agent, or Firm* — Carlson, Gaskey & Olds, P.C.

(57) ABSTRACT

A gas turbine engine article includes a ceramic matrix composite (CMC) wall that has an exterior core gaspath surface and a blind hole. A monolithic ceramic repair element is attached with the CMC wall. The repair element includes a repair element surface that is substantially flush with the at least one exterior core gaspath surface. The ceramic repair element includes a through-hole aligned with the blind hole. A fastener extends through the through-hole and into the blind hole and secures the repair element with the CMC wall.

18 Claims, 4 Drawing Sheets

(56) References Cited

U.S. PATENT DOCUMENTS

| | | | | |
|---|---|---|---|---|
| 11,193,381 | B2 * | 12/2021 | Whittle | F01D 9/041 |
| 11,292,217 | B2 | 4/2022 | Roberts et al. | |
| 11,459,908 | B2 | 10/2022 | Decesare et al. | |
| 11,560,799 | B1 * | 1/2023 | Harris | F01D 9/041 |
| 12,234,745 | B1 * | 2/2025 | Kray | F01D 7/00 |
| 12,311,483 | B2 * | 5/2025 | Ryu | B23P 6/005 |
| 12,397,516 | B2 * | 8/2025 | Roberts | B29C 73/04 |
| 2005/0217110 | A1 * | 10/2005 | Topal | F01D 5/005 29/402.09 |
| 2008/0203236 | A1 * | 8/2008 | Mazzola | F01D 5/284 244/35 R |
| 2018/0135427 | A1 * | 5/2018 | Surace | F01D 5/187 |
| 2018/0135445 | A1 * | 5/2018 | Surace | F01D 5/282 |
| 2018/0135464 | A1 * | 5/2018 | Propheter-Hinckley | F01D 5/282 |
| 2018/0304371 | A1 * | 10/2018 | Wiebe | B23P 6/002 |
| 2020/0040749 | A1 * | 2/2020 | Holleran | F01D 5/282 |
| 2020/0230752 | A1 | 7/2020 | Hafner et al. | |
| 2022/0041519 | A1 | 2/2022 | Roberts et al. | |
| 2022/0090505 | A1 * | 3/2022 | Farmer | F01D 5/188 |
| 2022/0176658 | A1 | 6/2022 | Roberts et al. | |
| 2024/0141790 | A1 * | 5/2024 | Yadav | F01D 5/286 |

* cited by examiner

REPAIR OF CERAMIC MATRIX COMPOSITE GAS TURBINE ENGINE ARTICLE WITH MONOLITHIC CERAMIC REPAIR ELEMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A gas turbine engine article according to an example in the present disclosure includes a ceramic matrix composite (CMC) wall having an exterior core gaspath surface. The CMC wall has a blind hole, and a monolithic ceramic repair element attached with the CMC wall. The repair element includes a repair element surface that is substantially flush with the at least one exterior core gaspath surface. The ceramic repair element has a through-hole aligned with the blind hole, and a fastener extends through the through-hole and into the blind hole to secure the repair element with the CMC wall.

In a further embodiment of any of the foregoing embodiments, the CMC wall is an edge portion of a platform of a vane.

In a further embodiment of any of the foregoing embodiments, the monolithic ceramic repair element forms a shiplap joint with the CMC wall.

In a further embodiment of any of the foregoing embodiments, the fastener extends across the shiplap joint.

In a further embodiment of any of the foregoing embodiments, the fastener is elemental silicon.

In a further embodiment of any of the foregoing embodiments, the fastener is silicon carbide.

In a further embodiment of any of the foregoing embodiments, the fastener includes a shank and a head, and the head is embedded in the CMC wall.

In a further embodiment of any of the foregoing embodiments, the CMC wall is a leading edge portion of an airfoil.

In a further embodiment of any of the foregoing embodiments, the fastener includes a shank and a head, and the head is embedded in the CMC wall.

A gas turbine engine according to an example of the present disclosure includes a compressor section, a combustor in fluid communication with the compressor section, and a turbine section in fluid communication with the combustor. The turbine section has a turbine article according to any of the foregoing embodiments.

In a further embodiment of any of the foregoing embodiments, the monolithic ceramic repair element forms a shiplap joint with the CMC wall.

In a further embodiment of any of the foregoing embodiments, the fastener extends across the shiplap joint.

In a further embodiment of any of the foregoing embodiments, the fastener is selected from the group consisting of elemental silicon and silicon carbide.

In a further embodiment of any of the foregoing embodiments, the fastener includes a shank and a head, and the head is embedded in the CMC wall.

A method of repairing a damaged portion of a ceramic matrix composite (CMC) wall of a gas turbine engine article according to an example of the present disclosure includes removing the damaged region from the CMC wall. The CMC wall is provided with a blind hole. A monolithic ceramic repair element is provided that includes a through-hole. The monolithic ceramic repair element is positioned on the CMC wall such that the through-hole aligns with the blind hole. The repair element is then secured with the CMC wall by arranging a fastener to extend through the through-hole and into the blind hole.

In a further embodiment of any of the foregoing embodiments, the blind hole is provided by a drilling operation.

In a further embodiment of any of the foregoing embodiments, the arranging of the fastener includes forming the fastener in situ in the through-hole and the blind hole.

In a further embodiment of any of the foregoing embodiments, the forming of the fastener in situ includes introducing molten material into the through-hole and the blind hole, the molten material solidifying to form the fastener.

In a further embodiment of any of the foregoing embodiments, the blind hole intersects a void in the CMC wall, the molten material filling the through-hole and the blind hole to form a shank and the molten material filling the void to form a head attached with the shank.

In a further embodiment of any of the foregoing embodiments, the fastener is pre-fabricated and the arranging includes mechanically inserting the fastener through the through-hole and into the blind hole.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. In this disclosure, like reference numerals designate like elements where appropriate and reference numerals with the addition of one-hundred or multiples thereof designate modified elements that are understood to incorporate the same features and benefits of the corresponding elements. The drawings that accompany the detailed description can be briefly described as follows.

DETAILED DESCRIPTION

Figure 1:
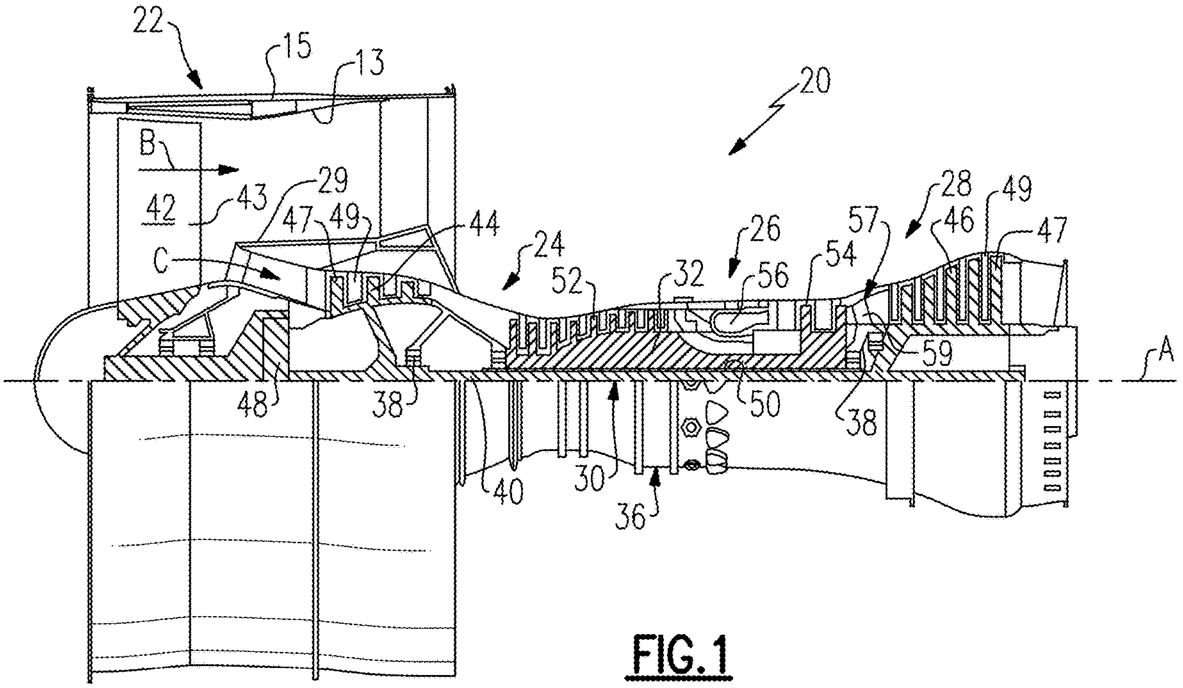
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core gaspath C for compression and communication into the combustor section 26 then expansion through the turbine section 28. A splitter 29 aft of the fan 42 divides the air between the bypass flow path B and the core gaspath C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axis.

Airflow in the core gaspath C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core gaspath C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. It should be understood that the teachings disclosed herein may be utilized with various engine architectures, such as low-bypass turbofan engines, prop fan and/or open rotor engines, turboprops, turbojets, etc. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of [(Tram ° R.)/(518.7° R.)]0.5. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core gaspath C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F. and 975.0° F. The relatively low EGT can be utilized in combination with the other techniques disclosed herein to reduce fuel consumption.

Figure 2:
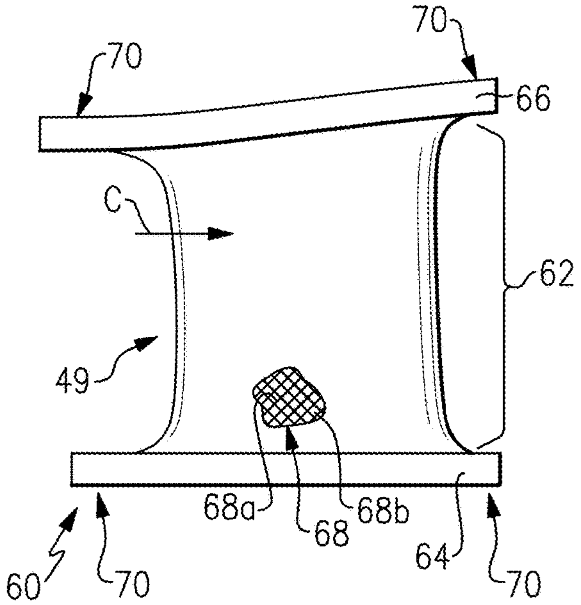
FIG. 2 illustrates a repairable vane from the engine.

FIG. 2 illustrates an example of a repairable gas turbine engine article 60 from the turbine section 28 of the engine 20. In this example, the article 60 is a vane 49. The vane 49 includes an airfoil section 62 that extends radially between inner and outer platforms 64/66. The vane is formed of a ceramic matrix composite (CMC), shown in cutaway at 68. The CMC 68 is comprised of ceramic fiber plies **68*a* in a ceramic matrix 68*b*. Example ceramic matrices are silicon-containing ceramics, such as but not limited to, a silicon carbide (SiC) matrix or a silicon nitride (Si3N4) matrix. Ceramic fibers are formed of bundles of filaments and may include, but are not limited to, silicon carbide (SiC) fibers or silicon nitride (Si3N4) fibers. The CMC 68 may be, but is not limited to, a SiC/SiC CMC in which SiC fiber plies are disposed within a SiC matrix. A coating, such as but not limited to an environmental barrier coating, may be provided to protect the CMC 68**, e.g., from oxygen and/or foreign substance ingress, from impact damage, from erosion/wear, and/or from thermal exposure.

The platforms 64/66 (e.g., CMC walls) radially bound the core gaspath C. In this regard, the platforms 64/66 include portions 70 that extend fore or aft of the airfoil section 62. The portions 70 on the left-hand side in FIG. 2 are leading edge portions of the platforms 64/66, and the portions 70 on the right-hand side in FIG. 2 are trailing edge portions of the platforms 64/66. The portions 70 may be subject to damage over a period of use in the engine 20. For example, damage causes blemishes in the material, usually from one or more conditions during use in the engine 20, as compared to the material as originally fabricated, prior to any use in the engine 20. As examples, the damage includes at least one of spalling, cracking, erosion, or recession. Spalling refers to a loosening or detachment of a barrier coating or CMC material. Cracking refers to a breakage and splitting in a barrier coating and/or in the CMC underlying the coating. Erosion refers to a loss of material from a barrier coating and/or CMC due to impact from particles in the hot gas flow, and recession refers to a loss of material due to high velocity, high pressure vapor in the hot gas flow that reacts with silicon-containing ceramics, such as silicon carbide, to form volatile species.

Figure 3:
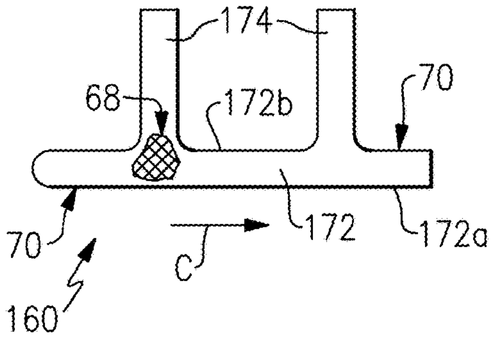
FIG. 3 illustrates a repairable seal from the engine.

FIG. 3 illustrates another example of a repairable gas turbine engine article 160. In this example, the article 160 is a seal, which may also be known as an outer air seal. Such seals are provided in a circumferential row around turbine blades and serve as an outer boundary of the core gaspath C. In this example, the seal includes a wall 172 (e.g., CMC wall) that has a core gaspath side 172*a* and a non-core gaspath side 172*b*. Flanges 174 project from the non-core gaspath side 172*b* and serve to mount the seal in the engine 20, such as to an engine case or an intermediate structural frame that is attached to an engine case. Like the vane, the seal is formed of a CMC 68 as described earlier above.

The wall 172 includes portions 70 that extend fore and aft of the flanges 174. The portion 70 on the left-hand side in FIG. 3 is a leading edge portion of the seal, and the portion 70 on the right-hand side in FIG. 3 is a trailing edge portion of the seal. Like on the vane, the portions 70 on the seal are subject to damage over a period of use in the engine 20.

Damage on the vane or the seal may be detected via borescope inspection or engine tear-down. Although the portions 70 are not structural (i.e., load-bearing attachment features), damage to the portions 70 may cause the article to be deemed unserviceable. However, if a damaged article can be repaired, the service life can be extended.

An examination and evaluation of the damage may be conducted in order to determine severity and thus whether the article 60/160 is a candidate for repair. The examination may include, but is not limited to, visual inspection with or without magnification, acoustic inspection, structured light inspection, thermal imaging or CT scan inspection. For example, damage that extends over a relatively large area (e.g. outside of the portion 70) of the CMC wall may be considered unrepairable, while damage that is limited to the portion 70 or a coating in the portion 70 may be considered repairable.

Figure 4:
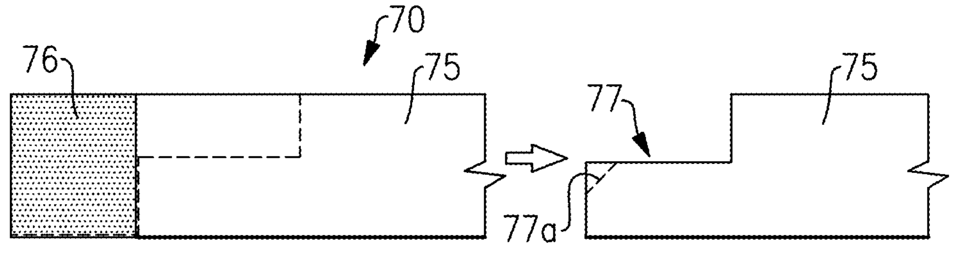
FIG. 4 illustrates a removal step of a repair method.

FIG. 4 depicts an action in a repair method for the damaged portion or portions 70 of the articles 60/160. The CMC wall is indicated at 75, which depending on which article 60 or 160 is either platforms 64/66 of the vane or the wall 172 of the seal. For instance, the article 60/160 is removed from the engine 20 and the damaged region 76 is removed from the CMC wall 75. As an example, the removal includes a cutting operation to separate the damaged region 76 from the remainder of the article, but is not limited thereto, and other material removal operations may be used in combination with, or instead of, cutting. As shown by the dashed outline area, removal may be over-inclusive and remove not only the damaged region 76 but also some undamaged material of the CMC wall 75, to ensure that all of the damaged region 76 is eliminated. If the article 60/160 includes a coating, the coating may be removed prior to any removal of the CMC wall 75. The coating is removed in a stripping process. The stripping process may be a chemical stripping, a mechanical stripping, or a combination of chemical and mechanical. In this example, the material removal forms a rabbet 77 in the CMC wall 75. The rabbet 77 will subsequently form half of a shiplap joint in the repair. The corner of the rabbet 77 may be provided with a chamfered edge 77*a*, to avoid a sharp corner in contact with the mating repair element later on.

Figure 5:
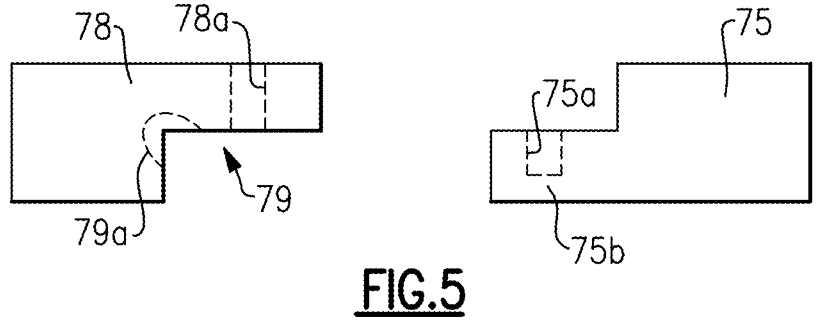
FIG. 5 illustrates another step of a repair method.

Next, as shown in FIG. 5, a monolithic ceramic repair element 78 is provided for attachment with the CMC wall 75. The monolithic ceramic repair element 78 is configured as a rabbet 79 that is complementary in geometry to the rabbet 77 in the CMC wall 75. In contrast to a CMC that includes ceramic fiber plies in a ceramic matrix, a "monolithic ceramic" does not contain fibers or reinforcement and is formed of a single material. Example monolithic ceramics include silicon-containing ceramics, such as silicon carbide (SiC) or silicon nitride ($Si_3N_4$). The repair element 78 is formed of monolithic ceramic for ease of manufacture, as it can be formed to net or near net shape or readily cut to custom shape from a stock material. Optionally, in addition to, or instead of, the chamfered edge 77*a*, the rabbet 79 of the repair element 78 may be provided with a fillet 79*a*, to avoid a sharp corner in contact with the mating CMC wall 75 later on.

The repair element 78 is provided with a through-hole 78*a*, which extends through the rabbet 79. For instance, the through-hole 78*a* is pre-existing in the repair element 78, either from a prior drilling process or from formation during manufacture of the repair element 78. Alternatively, the through-hole may be drilled on-demand in preparation for the repair, such as to ensure that the through-hole 78*a* is properly positioned for alignment.

The ceramic wall 75 includes a blind hole 75*a*. For example, the blind hole 75*a* is provided by a drilling operation, for instance in a co-drilling operation that also forms the through-hole 78*a*. As the blind hole 75*a* does not go all the way through the CMC wall 75, a portion 75*b* of the CMC wall 75 remains between the bottom of the blind hole 75*a* and the core gaspath surface of the CMC wall 75. The portion 75*b* facilitates thermally insulating the blind hole 75*a*, and thus the later fasteners 82 in the hole, from high temperatures in the core gaspath C.

Figure 6:
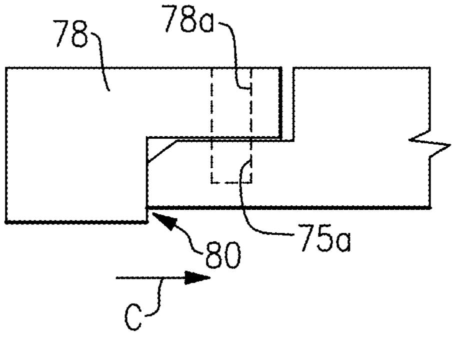
FIG. 6 illustrates an alignment step of a repair method.

As shown in FIG. 6, the repair element 78 is then positioned on the ceramic wall 75 such that the through-hole 78*a* and the blind hole 75*a* are in alignment. While the top surface of the repair element 78 is substantially flush with the adjacent surface of the CMC wall 75, the repair element may be oversized such that the bottom surface of the repair element 78 forms a step 80 with the core gaspath side of the CMC wall 75. The step 80 faces downstream so as impede ingress of gas flow into the interface between the repair element 78 and the CMC wall 75. The step 80 also allows the gas flow in the core gaspath C to smoothly cascade down the step 80 and thereby avoid an upstream-facing edge that could impede and disrupt flow.

Figure 7:
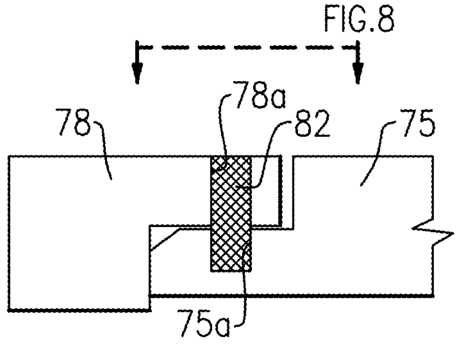
FIG. 7 illustrates an insertion step of a repair method.
Figure 8:
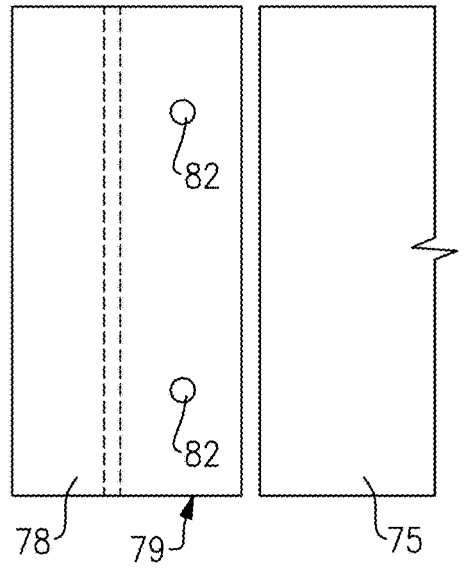
FIG. 8 illustrates a radial view of a repair element.

Once in alignment, as shown in FIG. 7, a fastener 82 is then inserted through the through-hole 78*a* and into the blind hole 75*a*. As an example, the fastener 82 is mechanically inserted, such as by manual insertion with aid of an insertion tool. For example, the fastener 82 is non-threaded and may be, but is not limited to, a straight pin. The fastener 82 is made of a material that has the same or slightly higher coefficient of thermal expansion as the CMC 68 and the monolithic ceramic. The fastener 82 secures the repair element 78 with the CMC wall 75. As will be appreciated, the repair element 78 and CMC wall 75 may include multiple holes 78*a*/75*a* and fasteners 82 to secure the repair element 78. For instance, multiple fasteners 82 may provide a more uniform support of the repair element 78 and prevent or reduce shifting of the position of the repair element 78 after attachment. For example, FIG. 8 shows a radial view according to the reference line in FIG. 7, in which the repair element 78 is secured with two fasteners 82. As will be appreciated, additional fasteners 82 may be used, such as three, four, five or ten fasteners 82, depending on the size and geometry of the repair element 78.

Figure 9:
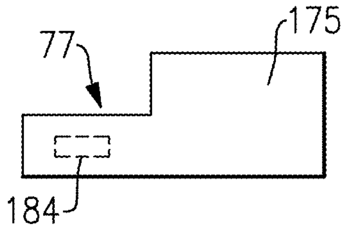
FIG. 9 illustrates another example of a portion of a CMC wall.
Figure 10:
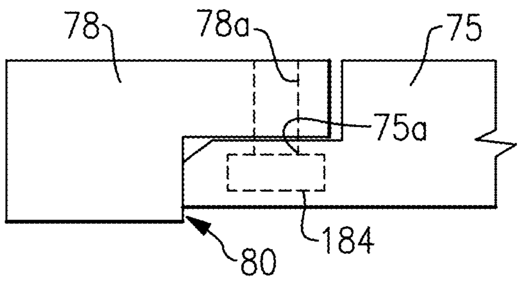
FIG. 10 illustrates a step of a repair that uses a void within the CMC wall.

FIG. 9 illustrates another example of a CMC wall 175. The CMC wall 175 is the same as the CMC wall 75 except that the CMC wall 175 includes a void 184 embedded therein. For example, the void 184 is a cutout region of one or more layers of the aforementioned ceramic fiber plies 68*a* of the CMC 68. In one example, the cutout region is provided in the ceramic fiber plies 68*a* (e.g., fabric) during a lay-up process prior to densification of the CMC 68 with the matrix 68*b* to form the CMC wall 75. As shown in FIG. 10, the subsequent blind hole 75*a* intersects the void 184.

Figure 11:
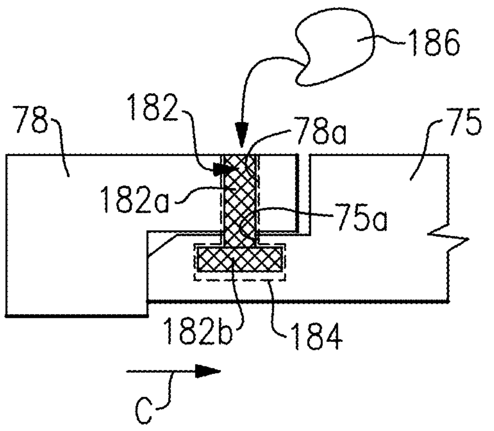
FIG. 11 illustrates in situ formation of a fastener in a repair method.

As depicted in FIG. 11, the fastener 182 is then formed in situ in the holes 78*a*/75*a* and void 184 by introducing molten material 186 into the through-hole 78*a*, the blind hole 75*a*, and the void 184. Upon cooling, the molten material solidifies to form the fastener 182. As an example, the molten material is elemental silicon, which may remain as elemental silicon or subsequently be converted to silicon carbide. The solidified portion of the fastener 182 in the holes 78*a*/75*a* forms a shank 182*a* and the portion in the void 184 forms a fastener head 182*b* that is attached with the shank 182*a*. The head 182*b* facilitates locking the fastener 182 and preventing the fastener 182 from dislodging. A portion of the molten material 186 may leak between the interface of the repair element 78 and the CMC wall 75. However, this may be acceptable as long as the leak does not reach the gaspath side (bottom) where it may be exposed to temperatures that are higher than or approach its melting point.

Figure 12:
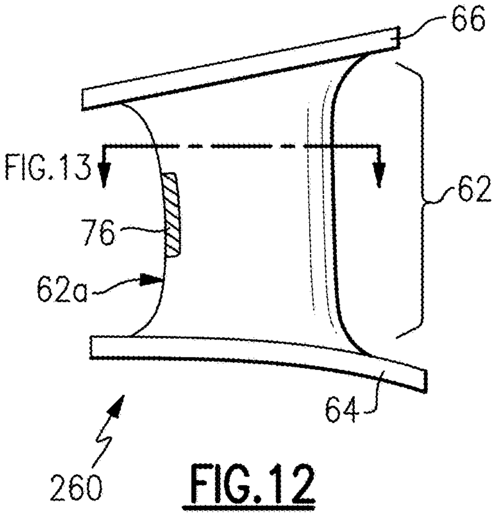
FIG. 12 illustrates another example article for repair.
Figure 13:
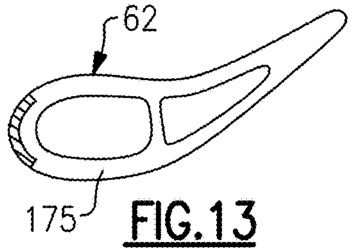
FIG. 13 illustrates a sectioned view of the article in FIG. 12.
Figure 14:
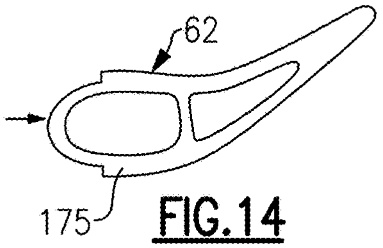
FIG. 14 illustrates a removal step of a repair method.
Figure 15:
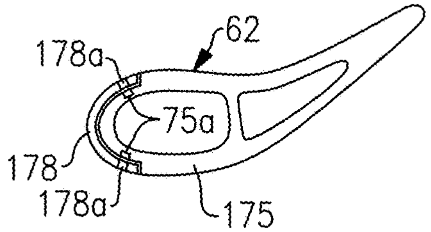
FIG. 15 illustrates positioning of a repair element in a repair method.
Figure 16:
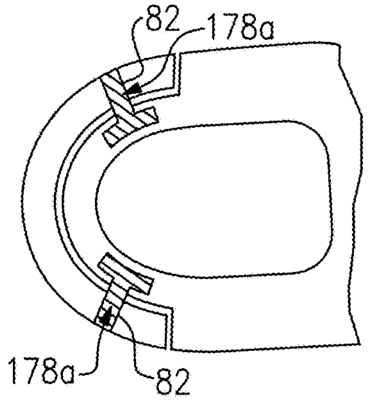
FIG. 16 illustrates securing the repair element in a repair method.

FIG. 12 illustrates another example of a repairable gas turbine engine article 260, which like the article 60, is a vane. In this example, rather than the damaged region 76 being on the platforms 64/66, the damaged region 76 is on the airfoil section 62, which is also considered to be a CMC wall 175 and, specifically, on a leading edge 62*a* of the airfoil section 62. FIG. 13 is a sectioned view of the vane according to the section line shown in FIG. 12. In FIG. 14, the damaged region 76 is removed, as previously described with reference to FIG. 4. In FIG. 15, a repair element 178 having through holes 178*a* is then positioned on the airfoil section 62 and secured with fasteners 82 (FIG. 16) that extend into the blind holes 75*a* on the CMC wall 175. In this example, there is no overlapping shiplap joint as in the previous examples, and a butt joint is formed instead, in which the fasteners 82 extend across the butt joint to secure the repair element 178 to the CMC wall 75. As in FIG. 11, the fasteners 82 in this example are formed in situ from a molten material that is subsequently solidified.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:

a ceramic matrix composite (CMC) wall having an exterior core gaspath surface, the CMC wall having a blind hole, the CMC of the wall comprised of ceramic fibers embedded in a ceramic matrix;

a monolithic ceramic repair element attached with the CMC wall, the monolithic ceramic of the repair element comprised of a single material with no fibers or reinforcement, the repair element including a repair element surface that is substantially flush with the at least one exterior core gaspath surface, the ceramic repair element including a through-hole aligned with the blind hole; and a fastener extending through the through-hole and into the blind hole, the fastener securing the repair element with the CMC wall, the fastener including a shank and a head, and the head is embedded in the CMC wall.

2. The article as recited in claim 1, wherein the CMC wall is an edge portion of a platform of a vane.

3. The article as recited in claim 2, wherein the monolithic ceramic repair element forms a shiplap joint with the CMC wall.

4. The article as recited in claim 3, wherein the fastener extends across the shiplap joint.

5. The article as recited in claim 1, wherein the fastener is elemental silicon.

6. The article as recited in claim 1, wherein the fastener is silicon carbide.

7. The article as recited in claim 1, wherein the CMC wall is a leading edge portion of an airfoil.

8. A gas turbine engine comprising:

a compressor section;

a combustor in fluid communication with the compressor section; and a turbine section in fluid communication with the combustor, the turbine section having a turbine article that includes:

a ceramic matrix composite (CMC) wall having an exterior core gaspath surface, the CMC wall having a blind hole, the CMC of the wall comprised of ceramic fibers embedded in a ceramic matrix, a monolithic ceramic repair element attached with the CMC wall, the monolithic ceramic of the repair element comprised of a single material with no fibers or reinforcement, the repair element including a repair element surface that is substantially flush with the at least one exterior core gaspath surface, the ceramic repair element including a through-hole aligned with the blind hole, and a fastener extending through the through-hole and into the blind hole, the fastener securing the repair element with the CMC wall, the fastener including a shank and a head, and the head is embedded in the CMC wall.

9. The gas turbine engine as recited in claim 8, wherein the monolithic ceramic repair element forms a shiplap joint with the CMC wall.

10. The gas turbine engine as recited in claim 9, wherein the fastener extends across the shiplap joint.

11. The gas turbine engine as recited in claim 8, wherein the fastener is selected from the group consisting of elemental silicon and silicon carbide.

12. A method of repairing a damaged portion of a ceramic matrix composite (CMC) wall of a gas turbine engine article, the method comprising:

removing the damaged region from the CMC wall, the CMC wall has an exterior core gaspath surface;

providing the CMC wall with a blind hole;

providing a monolithic ceramic repair element that includes a through-hole and positioning the monolithic ceramic repair element on the CMC wall such that the through-hole aligns with the blind hole; and securing the repair element with the CMC wall by arranging a fastener to extend through the through-hole and into the blind hole, the fastener including a shank and a head, and the head is embedded in the CMC wall.

13. The method as recited in claim 12, wherein the blind hole is provided by a drilling operation.

14. The method as recited in claim 13, wherein the arranging of the fastener includes forming the fastener in situ in the through-hole and the blind hole.

15. The method as recited in claim 14, wherein the forming of the fastener in situ includes introducing molten material into the through-hole and the blind hole, the molten material solidifying to form the fastener.

16. The method as recited in claim 15, wherein the blind hole intersects a void in the CMC wall, the molten material filling the through-hole and the blind hole to form the shank and the molten material filling the void to form the head attached with the shank.

17. The method as recited in claim 12, wherein the fastener is pre-fabricated and the arranging includes mechanically inserting the fastener through the through-hole and into the blind hole.

18. A gas turbine engine article comprising:

a ceramic matrix composite (CMC) wall having an exterior core gaspath surface, the CMC wall having a blind hole that does not extend all the way through the CMC wall;

a monolithic ceramic repair element attached with the CMC wall, the repair element including a repair element surface that is substantially flush with the at least one exterior core gaspath surface, the ceramic repair element including a through-hole aligned with the blind hole; and a fastener extending through the through-hole and into the blind hole, the fastener securing the repair element with the CMC wall.

* * * * *